United States Patent
Jones et al.

(10) Patent No.: US 9,306,222 B2
(45) Date of Patent: Apr. 5, 2016

(54) METHOD OF ASSEMBLING A BATTERY

(75) Inventors: Adam Jones, Abertillery (GB); Adam Morgan, Abertillery (GB); Gavin Davies, Abertillery (GB)

(73) Assignee: Atraverda Limited, Abertillery (GB)

( * ) Notice: Subject to any disclaimer, the term of this patent is extended or adjusted under 35 U.S.C. 154(b) by 326 days.

(21) Appl. No.: 13/997,393

(22) PCT Filed: Dec. 23, 2011

(86) PCT No.: PCT/GB2011/001768
§ 371 (c)(1),
(2), (4) Date: Sep. 13, 2013

(87) PCT Pub. No.: WO2012/085515
PCT Pub. Date: Jun. 28, 2012

(65) Prior Publication Data
US 2014/0017561 A1   Jan. 16, 2014

(30) Foreign Application Priority Data

Dec. 24, 2010  (GB) .................................. 1022043.2

(51) Int. Cl.
*H01M 2/00* (2006.01)
*H01M 2/02* (2006.01)
*H01M 6/02* (2006.01)
*H01M 10/04* (2006.01)
*H01M 10/14* (2006.01)
*H01M 10/18* (2006.01)

(52) U.S. Cl.
CPC .............. *H01M 6/02* (2013.01); *H01M 10/044* (2013.01); *H01M 10/0418* (2013.01); *H01M 10/14* (2013.01); *H01M 10/18* (2013.01); *Y02E 60/126* (2013.01)

(58) Field of Classification Search
CPC ........................................................ H01M 2/00
See application file for complete search history.

(56) References Cited

U.S. PATENT DOCUMENTS

| 4,125,680 A | 11/1978 | Shropshire et al. |
| 4,164,068 A | 8/1979 | Shropshire et al. |
| 4,925,507 A | 5/1990 | Yamaguchi |

(Continued)

FOREIGN PATENT DOCUMENTS

| WO | 02/091506 | 11/2002 |
| WO | 2006114605 | 11/2006 |
| WO | 2011001148 | 1/2011 |

OTHER PUBLICATIONS

International Search Report, PCT/GB2011/001768, dated Aug. 2, 2012, 4 pages.

(Continued)

*Primary Examiner* — Jacob Marks
(74) *Attorney, Agent, or Firm* — Senniger Powers LLP

(57) ABSTRACT

A method of joining a substrate for a bipolar electrode of a bipolar battery to a frame for supporting the bipolar electrode for use in the bipolar battery includes the implanting of a thermoplastic material in the substrate. The substrate and the frame are then vibration welded together at a frequency in the range of 50 Hz to 1 kHz to melt the thermoplastic material. The melted thermoplastic material forms a continuous or substantially continuous loop around the substrate to join the substrate and the frame together. A bipolar battery comprising a substrate and a frame joined together by the method, and a substrate for a bipolar electrode for use in the method are also described.

17 Claims, 3 Drawing Sheets

(56) References Cited

U.S. PATENT DOCUMENTS

Figure 1:
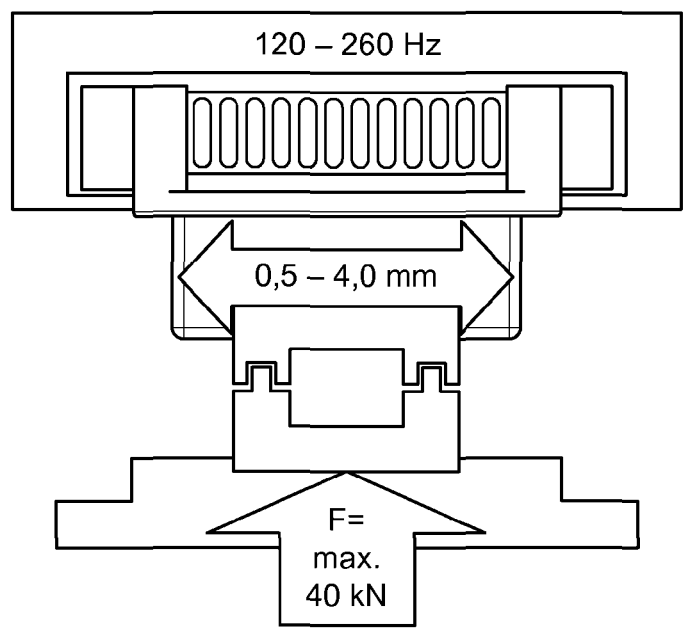

| | | |
|---|---|---|
| 5,068,160 A | 11/1991 | Clough et al. |
| 5,308,718 A | 5/1994 | Eidler et al. |
| 5,512,065 A | 4/1996 | Kump et al. |
| 5,667,537 A | 9/1997 | Richiardone et al. |
| 5,688,615 A | 11/1997 | Mrotek et al. |
| 6,241,836 B1 | 6/2001 | Skirha et al. |
| 2007/0193880 A1* | 8/2007 | Schick et al. ............ 204/297.01 |
| 2009/0142661 A1* | 6/2009 | Xiang .................. H01M 2/1022 429/176 |

OTHER PUBLICATIONS

Written Opinion, PCT/GB2011/001768, dated Aug. 2, 2012, 7 pages.
Great Britain Search Report, Application No. 1022043.2, dated Jan. 27, 2011, 8 pages.

* cited by examiner

METHOD OF ASSEMBLING A BATTERY

REFERENCE TO RELATED APPLICATIONS

This application is a U.S. national stage application of International Patent Application No. PCT/GB2011/001768, filed Dec. 23, 2011, and claims the benefit of Great Britain Application No. 1022043.2, filed Dec. 24, 2010, the entire disclosures of which are incorporated herein by reference.

The invention relates to a method of joining a first element of a bipolar battery to a second element of a bipolar battery. In particular, the invention relates to a method of joining together a bipolar substrate for a bipolar electrode and a frame for supporting a bipolar electrode for use in a bipolar battery. The present invention also relates to a bipolar battery, and a substrate for use in the described method.

Batteries, and in particular bipolar batteries are known in the art. Bipolar batteries comprise a plurality or assembly of bipolar substrates connected in series. At one end of the assembly of bipolar substrates is a positive monopole. At the other end of the assembly of bipolar substrates is the negative monopole. The bipolar substrate comprises an electrode. In the case of a bipolar lead-acid battery each electrode, except the monopoles at each end, has one side of the electrode covered with porous lead, which is the negative side of the bipolar electrode, and the other side (the positive), covered with porous lead dioxide. The electrodes may be formed from, for example, Ebonex™ ceramic. Optionally a thin layer of metal is applied to the electrode before the paste is applied. In use, current passes through the electrodes perpendicular to the electrode surfaces at uniform current density.

Typically the bipolar substrates are held together in a plastic framework. Sealing the bipolar substrates is achieved in the laboratory by the use of gaskets of appropriate thickness and made from, for example, butyl, silicone or thermoplastic elastomer rubber sheet. The entire assembly is held together by metal straps and bolts of suitable length. In a commercial battery typically the substrates are sealed into a pre-moulded plastic container having slots for each substrate. The battery is then electrically formed in the usual way (see for example International patent application no. PCT/GB2006/001504).

It is one of the objects of the present invention to provide an improved method of fabricating or assembling a battery.

The present inventors have found that assemblies of bipolar substrates may be joined together by supporting each bipolar substrate into a plastic frame. The substrates are joined to the plastic frame using adhesive. The plastic frames are then joined and sealed together using adhesive.

However, this method has a number of limitations. Firstly, it is vital to ensure that enough adhesive is used to form a complete seal around the substrates and frames, and between adjacent frames. Upon compression of the substrates and frames and/or the frames together, some adhesive is forced out from the join and onto the surface of the formed assembly. This unsightly adhesive is then removed in a further cleaning step to form the assembled bipolar substrates in the frames and the battery. A further disadvantage of this method is that adhesive is expensive.

It is important that the bipolar substrates are sealed to the frames in an air tight manner. It is also important that the frames containing the bipolar substrates are sealed together in an air tight manner. The introduction of air into the battery can lead to electrical self-discharge. Moreover, it is important that the battery is sealed so that the acid electrolyte can be added between the bipolar electrodes.

Alternatively, the substrates may be joined to their respective frames and the plastic frames joined and sealed together using ultrasonic welding. With this method, the two pieces to be joined are sandwiched together and an ultrasonic horn is used to locally apply acoustic vibrations in the region of 20 kHz-70 kHz to the workpieces. The acoustic vibrations melt the interface between two workpieces, creating a joint.

However, ultrasonic welding is most useful for small parts, in particular those with a circular cross-section and great skill is involved in designing the horn to ensure uniform welding of the two components. Consequently, it is difficult to create an effective seal between the substrate and frame using ultrasonic welding. Further, this method is expensive and complex. Particularly since one of the workpieces typically requires specially designed protrusions at the interface between the two parts to direct the acoustic energy and ensure sufficient melting occurs.

It is one of the objects of the present invention to provide an alternative and/or improved method for joining a substrate for a bipolar electrode of a bipolar battery to a frame for supporting the bipolar electrode for use in the bipolar battery. It is another object to provide a method which is cheaper and/or more efficient than known methods. It is another object to provide a more reliable and/or consistent method of sealing a substrate for a bipolar electrode of a bipolar battery to a frame for supporting the bipolar electrode for use in the bipolar battery. It is another object to overcome at least some of the disadvantages of the prior art.

In a first aspect of the present invention there is provided a method of joining a substrate for a bipolar electrode of a bipolar battery to a frame for supporting the bipolar electrode for use in the bipolar battery, the method comprising: implanting a thermoplastic in the substrate, and vibration welding the substrate and the frame at a frequency in the range of 50 Hz to 1 kHz to at least partially melt the thermoplastic material such that it forms a continuous or substantially continuous loop around the substrate to join the substrate and the frame together.

In another aspect of the present invention there is provided a bipolar battery comprising a substrate for a bipolar electrode of a bipolar battery and a frame for supporting the bipolar electrode for use in the bipolar battery joined together by the method as defined herein.

In another aspect of the present invention there is provided a substrate for a bipolar electrode for use in the method described above wherein the substrate comprises a thermoplastic material.

Vibration welding is an example of a friction welding technique. Friction welding can be used to form bonds between materials. As used herein vibration welding includes linear vibration welding, orbital friction welding, spin welding, angular friction welding and mixtures of two or more thereof. Most preferably the vibration welding used herein is linear vibration welding.

The present inventors have, in International patent application no. PCT/GB2010/001272, described a method of sealing together two elements of a bipolar battery, the method comprising: interposing an inductive heating element between the two elements; applying a current to the inductive heating element to generate localised heat to melt material in the vicinity of the heating element to seal the two elements together. One of the advantages of the method described herein for joining a substrate for a bipolar electrode of a bipolar battery to a frame for supporting the bipolar electrode for use in the bipolar battery over the method described in PCT/GB2010/001272 is that the present method does not require an inductive heating element to be introduced into the battery assembly. Thus, the battery component or battery assembly method described herein is simpler and may be cheaper than the method described in PCT/GB2010/001272.

One of the advantages of the method described herein is that it permits the use of vibration welding to join (and preferably seal) a substrate for a bipolar electrode of a bipolar battery to a frame for supporting the bipolar electrode for use in the bipolar battery in a precise manner. A further advantage of the method described herein is that the two elements can be sealed together to form a material which has a low leakage (i.e. the seal is preferably air-tight, and/or electrolyte cannot penetrate the join). This is of particular importance when forming bipolar batteries. There is a desire to provide a commercially efficient, effective method of assembling bipolar batteries and/or bipolar battery components in which the leakage is low (i.e. the seals and bonds between components are strong and preferably air-tight).

The present inventors have also advantageously found that the method described herein may successfully be used to join the substrate to a frame whether or not the substrate is pasted or not pasted. This is possible because the use of vibration welding machinery allows the two elements to be positioned together accurately. However, it would have been expected that when the substrate was pasted then the process of vibration welding the two components together would displace the paste. However, surprisingly this was found not to be the case. This is even the case when the electrolyte paste has been cured and dried.

Thus, in one embodiment, the present invention includes joining a substrate for a bipolar battery to a frame for supporting a bipolar electrode, where the substrate is at least partially coated with a negative and/or positive paste (typically known as a plate, or pasted substrate). Alternatively, the substrate may not be pasted.

The use of linear vibration welding to join two plastic parts together is known, for example in the assembly of some automotive parts, for example the assembly of automotive fuel tanks, water bottles, dash board assemblies and inner door panels. Typically in linear vibration welding the elements to be joined together are brought into contact and then moved in a linear reciprocating motion relative to one another, typically under pressure. Typically the pressure is applied perpendicular (or substantially perpendicular) to the vibrational motion. Preferably the vibration welding used in the present invention is linear vibration welding.

Previously it was thought that it would not be possible to join a substrate for a bipolar electrode of a bipolar battery with a frame for supporting the bipolar electrode for use in the bipolar battery using vibration welding to provide a join which would be sufficient for the purposes of using in a battery. As outlined above, typically it is necessary for two elements of a battery to be joined together such that the two elements are sealed together in an air-tight manner. When the first element is a substrate for a bipolar electrode and the second element is a frame for supporting a bipolar electrode for use in a bipolar battery it is desirable for the two elements to be sealed together in an air-tight manner so that there is no leakage of electrolyte between the electrodes when the battery is formed. Additionally, it was thought that the process of vibration welding together a substrate for a bipolar battery and a frame for a bipolar battery, would result in the elements being damaged. As outlined below, a substrate for a bipolar battery may be formed of titanium suboxide particles and a resin or polymer. The present inventors have surprisingly found that such a substrate may be joined to a frame using vibration welding as described herein without substantially damaging the substrate or the frame. Additionally, they have surprisingly found that such a method may be used without requiring complicated adaption of the frames which are currently used.

Without wishing to bound by any particular theory, it is thought that one of the reasons that vibration welding was not previously believed to be suitable for use in methods of making conventional batteries was because typically the battery components are very heavy, so a welding method which involves moving at least one of these heavy components would not be commercially useful. Thus, the geometry and heavy weight of the components has dissuaded the use of such a method.

Vibration welding machines suitable for use in the present invention include, for example, the commercially available machine called Branson M-522HI. However, it will be understood that other suitable vibration welding machines may be of use.

Preferably one or both of the elements to be joined are vibrated, preferably in the plane of the joint, at an amplitude of from about 1.0 mm to about 1.8 mm, more preferably from about 1.2 mm to about 1.6 mm, and most preferably at about 1.5 mm, when the frequency is in the range of from about 180 Hz to about 260 Hz, more preferably from about 200 Hz to 250 Hz, and most preferably at about 240 Hz.

Preferably one or both of the elements to be joined are vibrated, preferably in the plane of the joint, at an amplitude of from about 2 mm to about 4 mm, more preferably from about 2.5 mm to about 3.5 mm, and most preferably at about 3 mm, when the frequency is in the range of from about 50 Hz to about 150 Hz, more preferably from about 75 Hz to 125 Hz, and most preferably at about 100 Hz.

Preferably, the pressure applied to the elements during the vibration welding is from 10 to 60 bar, more preferably from 20 to 50 bar, more preferably still approximately 30 bar.

The conditions used in the vibration welding, for example the amplitude, frequency and pressure, are preferably chosen to maximise the time efficiency of the process, the economic efficiency of running the machine and/or the strength of join (preferably seal) formed between the two elements.

The present inventors have advantageously found that a particularly good seal can be provided between the substrate and the frame if the width of the area to be bonded together on each of the elements is from 1 mm to 10 mm, preferably from 2 mm to 5 mm, most preferably approximately 3 mm. Preferably the seal is formed around the whole of the substrate and frame (for example in a continuous loop). The inventors have found that such an area provides a good seal which has low leakage and has good strength.

The present inventors have also advantageously found that a particularly good join or seal is provided when the depth of weld penetration is from 0.1 to 1 mm, more preferably from 0.2 to 0.5 mm, and most preferably approximately 0.3 mm. As used herein the term depth of weld penetration is meant the depth to which one of the elements penetrates the other element during the join formation.

Preferably, the material implanted in the substrate comprises acrylonitrile butadiene styrene, polyethylene, polypropylene, acrylonitrile butadiene styrene/polycarbonate, polyamides, polyimides or their blends and mixtures of two or more thereof.

Preferably the method as described herein is used to seal the substrate and the frame together. Preferably, an air-tight seal is formed by the described method.

Preferably the frame and the substrate have an interlocking configuration. This is preferable as it aids the elements being held together and helps to ensure that an air-tight seal is formed between the substrate and the frame. The frame may have complimentary tongue and groove configurations on each side, so that two adjacent frames may interlock with one another. The substrate and the frame may also be designed to have complementary tongue and groove configurations, so that they may interlock with one another.

Preferably, the frame comprises an interlocking feature into which the substrate may fit. For example, the frame may comprise a rim into which the substrate fits. Preferably the substrate is substantially planar.

The present invention also provides a battery, preferably a bipolar battery, comprising a substrate and a frame joined together by the method as described herein.

The substrate for a bipolar battery as described herein is typically formed of a mix of titanium suboxide particles (Ebonex™ particles) and resin. Such substrates and methods of forming them are well known in the art, see for example U.S. Pat. No. 4,422,917. It will also be understood that such substrates may be coated with a negative paste on one side of the electrode (typically porous lead), and/or a positive paste on the other side of the electrode (typically porous lead dioxide) for use in a bipolar lead acid battery. The substrate may be coated. Preferably, the substrate comprises $Ti_4O_7$, $Ti_5O_9$, $Ti_6O_{11}$, and mixtures of two or more thereof.

Preferably the substrate comprises titanium suboxide having the formula $Ti_nO_{2n-1}$ where n is 4 or greater. Preferably, n is a number from 4 to 10. Such suboxides are highly conductive and may be formed by sintering the powdered form of Magneli phase titanium suboxides. Magneli phases are members of the homologous series of the general formula $Ti_nO_{2n}$, where n is a number between 4 and 10. These ceramics are surprisingly corrosion resistant. Preferably the titanium suboxide is selected to provide a high level of conductivity. $Ti_4O_7$ and/or $Ti_5O_9$ are preferred. Some suboxides have low conductivity and poor corrosion resistance and preferably are avoided; an example is $Ti_3O_5$. Although the titanium suboxide may be provided as a mixture of the Magneli phases it is preferable that the presence of lower oxides such as TiO, $Ti_2O_3$, $Ti_3O_5$ is minimised and preferably entirely avoided.

Typically the substrates are substantially rectangular and have height and width dimensions of about 150 mm by 190 mm. Larger sized substrates may also be of use, for example those having height and width dimensions of about 500 mm by 400 mm. Typically the substrates have a thickness of from about 1 mm to about 5 mm, preferably from about 1 mm to about 3 mm, most preferably about 1.5 mm.

Suitable frames from use in this invention are made from a plastic. Preferably the frame comprises a thermoplastic and/or thermosetting material. Preferably the frame comprises (acrylonitrile butadiene styrene) ABS.

Typically the frames are substantially rectangular and have height and width dimensions of approximately 100 mm bigger than the height and width of the substrate for which they are to be used in combination with.

In one aspect of the present invention there is provided a substrate for a bipolar electrode for use in the method described herein wherein the substrate comprises a thermoplastic material which is implanted in the substrate and forms a continuous or substantially continuous loop around the substrate.

Preferably, the thermoplastic material and/or thermosetting material comprises acrylonitrile butadiene styrene (ABS), polyethylene, polypropylene, acrylonitrile butadiene styrene/polycarbonate, polyimides, polyamides, polyesters, epoxy resins, or their blends thereof and mixtures of two or more thereof. Most preferably the thermoplastic material comprises (acrylonitrile butadiene styrene) ABS.

The thermoplastic material is implanted in the substrate, preferably around the edge, or near the edge of the substrate to a form a continuous, or substantially continuous band of thermoplastic material and/or thermosetting material.

Where the thermoplastic material does not form a continuous loop, preferably it is arranged such that when the material melts during the vibration welding, a continuous seal is formed between the two elements to be joined together. Thus, the thermoplastic material may be fashioned such that upon melting it forms a continuous seal between the substrate and the frame. Preferably a seal is formed around the whole of the substrate.

Preferably, the continuous or substantially continuous loop of thermoplastic material around the substrate has a width of from 1 mm to 15 mm, more preferably from 3 mm to 10 mm and most preferably approximately 6 mm. Preferably, the continuous or substantially continuous loop of thermoplastic material around the substrate has a depth of from 0.1 to 10 mm, more preferably from 0.3 to 0.8 mm, more preferably still approximately 0.5 mm. The present inventors have found that these dimensions are advantageous in order to form a strong bond between the substrate and frame. Too much of the thermoplastic material displaces the amount of resin and titanium suboxide particles (for example Ebonex Particles®) in the substrate, which is disadvantageous.

In order to join or seal the substrate for a bipolar electrode together with a frame for supporting a bipolar electrode for use in a bipolar battery, the substrate may be formed with a flange comprising a thermoplastic material. In one embodiment there is provided a substrate comprising at least a portion of thermoplastic material, or other component which will melt upon inductive heating to form a seal with a frame. The flange or portion of thermoplastic material may be designed such that it is of appropriate size and shape to interlock with the frame. The frame may also comprise thermoplastic material and/or thermosetting material in an area in the vicinity of where the frame and substrate will meet in place in the bipolar battery. Preferably the thermoplastic material is acrylonitrile butadiene (ABS).

The substrate comprising the thermoplastic material is not formed by first forming the substrate and then subsequently adding the thermoplastic material. Such a substrate would unlikely form a sufficiently strong join or seal with the frame when vibration welded to the frame. Instead, the substrate is formed such that the thermoplastic material, is an integral part of the substrate. This may be achieved, for example when the substrate comprises titanium suboxide particles, (for example it comprises $Ti_4O_7$, $Ti_5O_9$, $Ti_6O_{11}$, and mixtures of two or more thereof) and a resin mixture in the following way. Before this mixture is cured to form the substrate, the thermoplastic material, is positioned adjacent the uncured mixture. This is then at least partially cured to form the substrate having the thermoplastic material as an integral part of the substrate. Thus, the substrate comprises at least two regions, the first region being comprised of titanium suboxide particles, (for example it comprises $Ti_4O_7$, $Ti_5O_9$, $Ti_6O_{11}$, and mixtures of two or more thereof) and a resin mixture, and the second region comprising the thermoplastic material. Preferably, the second region comprises substantially no titanium suboxide particles, (for example it comprises $Ti_4O_7$, $Ti_5O_9$, $Ti_6O_{11}$, and mixtures of two or more thereof).

Preferably the thermoplastic material is positioned about the periphery and/or perimeter of the substrate. The thermoplastic material may be positioned on one and/or both sides, and/or the edge of the substrate. Preferably the substrates are substantially rectangular. The thermoplastic material is positioned such that when the substrate is positioned in the frame for use in the battery, the thermoplastic material in the substrate contacts the frame such that upon vibration welding a join (and preferably a seal) is formed.

Preferably both the substrate and the frame comprise a material which at least partially melts upon vibration welding to join the substrate and the frame together.

It will be understood that wherein the term the thermoplastic material is used herein, that other suitable materials may be used which melt upon vibration welding to form a join, and preferably a seal between the substrate and the frame.

The present invention will now be described further, by way of example only, with reference to the following figures, in which:

FIG. 1: shows a schematic diagram of two elements for battery being vibration welded together. The horizontal arrow indicates horizontal linear vibrational motion. The vertical arrow indicates that force is applied substantially perpendicular to the vibrational motion of the two elements.

Figure 2:
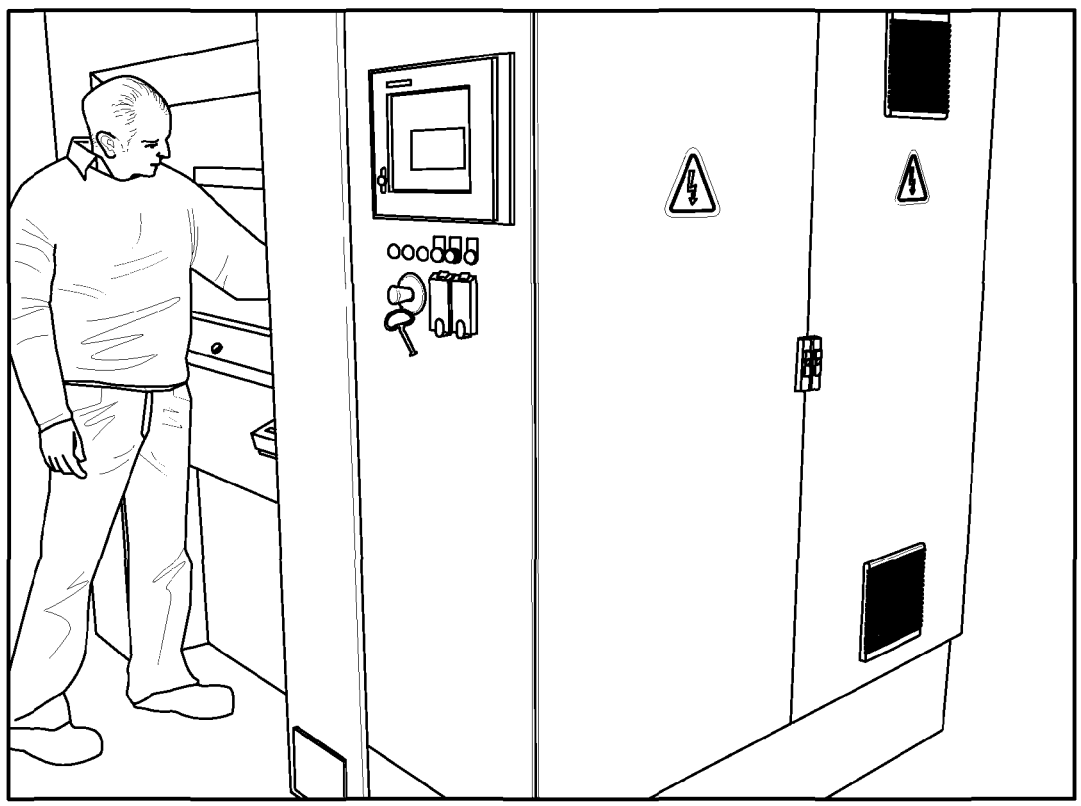

FIG. 2: shows a photograph of a vibration welding machine.

Figure 3:
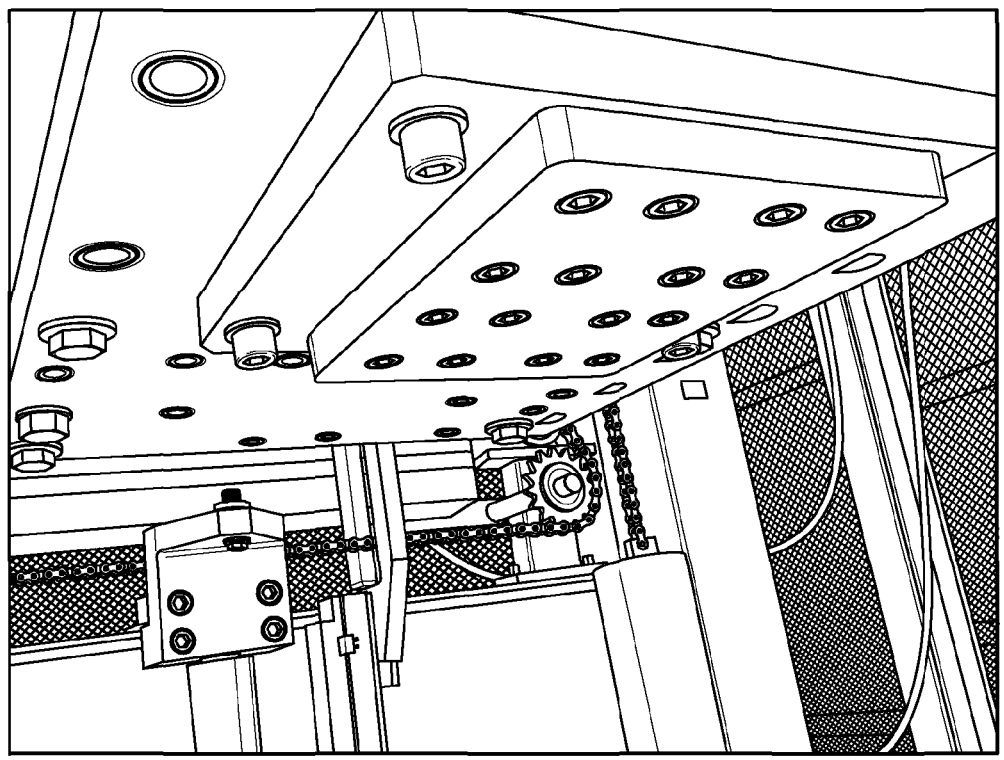

FIG. 3: shows a photograph of the top tool of the vibration welding machine unloaded.

Figure 4:
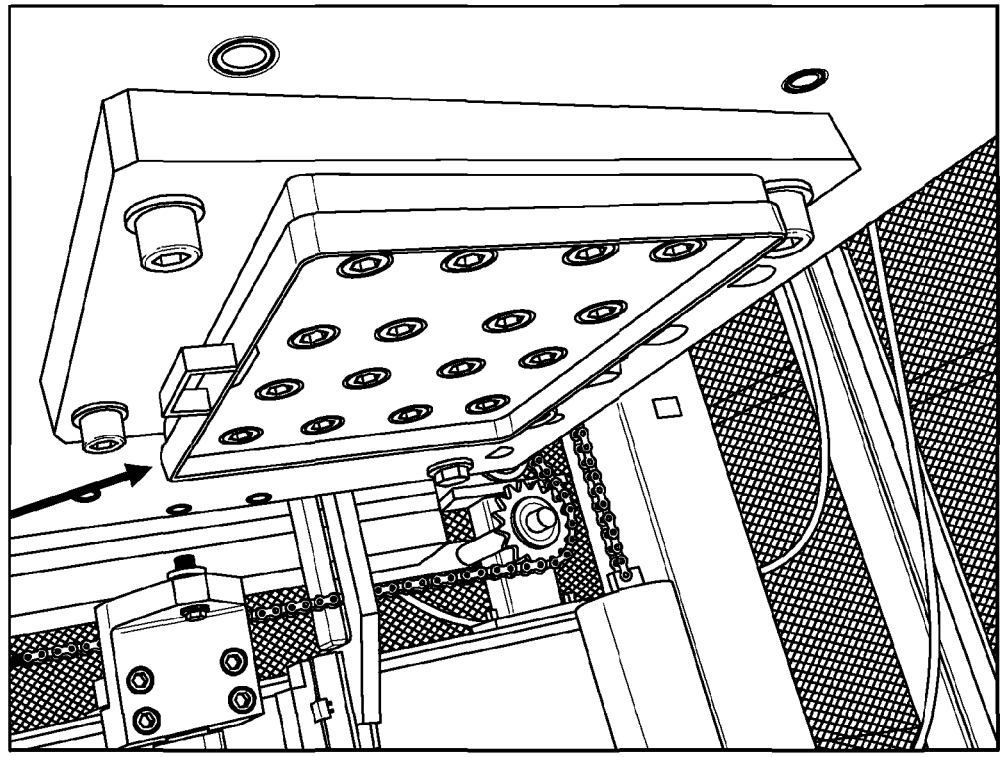

FIG. 4: shows a photograph of the top tool of the vibration welding machine loaded with a frame for supporting a bipolar electrode for use in a bipolar battery (indicated by the arrow).

Figure 5:
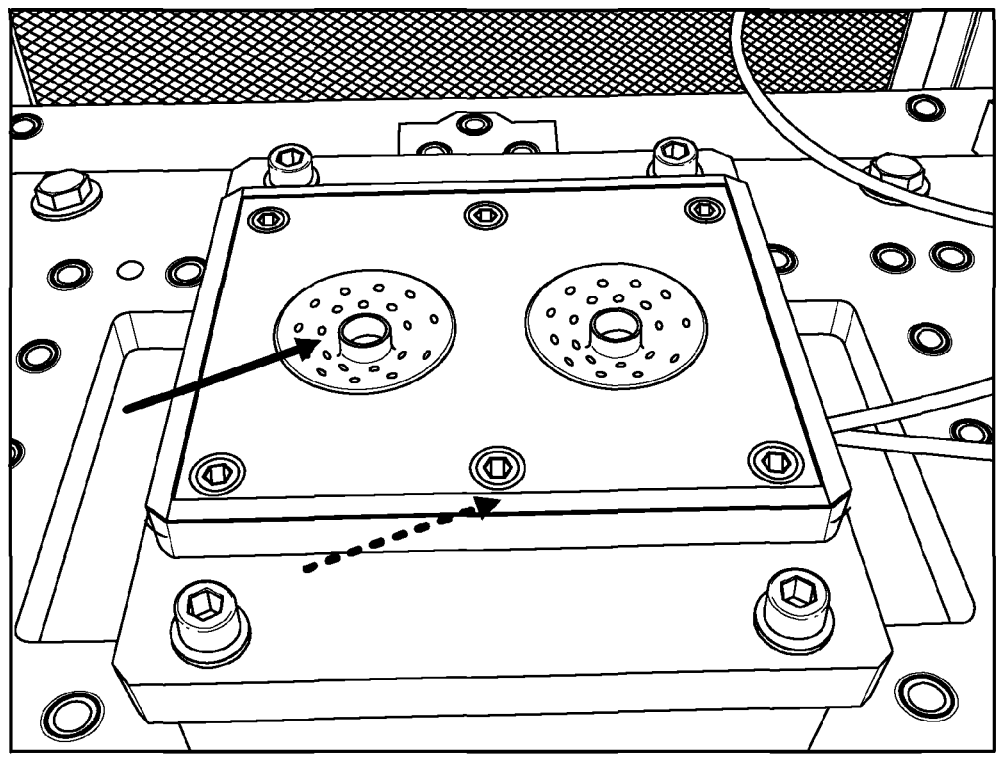

FIG. 5: shows a photograph of a bottom tool of the vibration welding machine unloaded. The circles indicate the presence of suction cups used to locate one of the elements (shown by an arrow). The edge of the bottom tool is at least partially surrounded with a grip strip used to keep the element located correctly (indicated by the dotted arrow).

Figure 6:
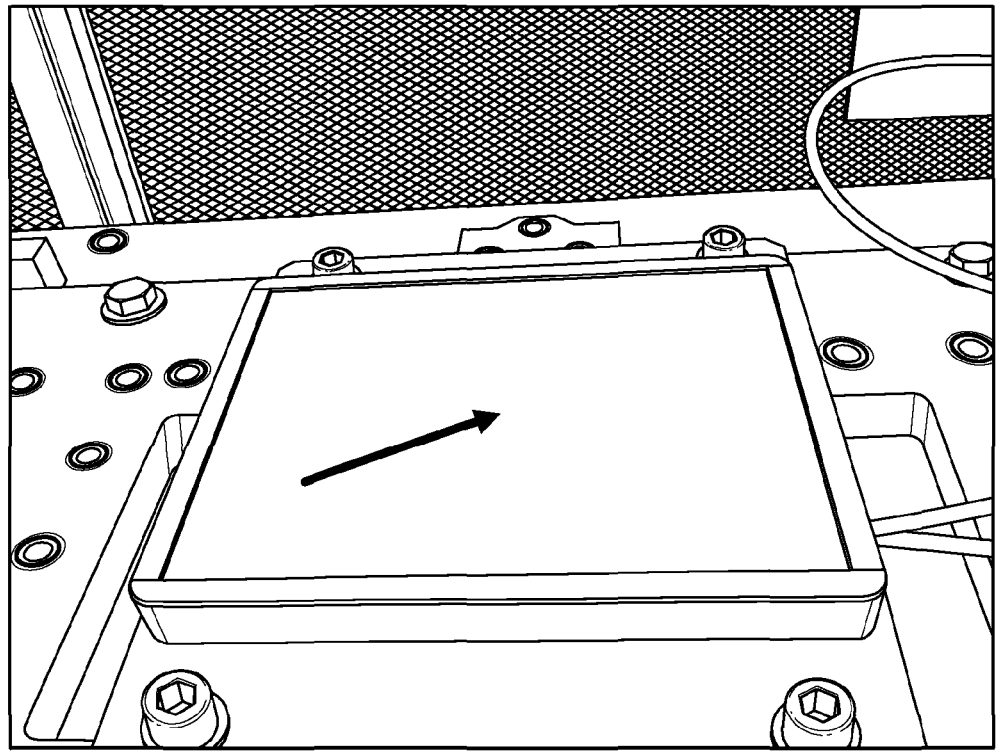

FIG. 6: shows a photograph of a bottom tool of the vibration welding machine loaded. The arrow indicates the position of one of the elements. In this figure the element is a substrate for a bipolar battery (show here unpasted).

EXAMPLES

Aspects of the present disclosure will now be described with reference to the following non-limiting examples.

Example 1

An (acrylonitrile butadiene styrene) ABS bipolar battery frame was placed into a specially designed top tool of a Branson M522 Hi vibration welding machine and a pasted bipolar substrate was placed into the specially designed holder in the bottom tool. The bipolar substrate comprised a thermoset composite of $Ti_4O_7$, $Ti_5O_9$ and $Ti_6O_{11}$ particles within a thermoset resin binder and incorporated an integral strip of ABS around the periphery of the pasted substrate (6 mm wide 0.5 mm thick strip). The dimensions of the substrate were 191×152×1.5 mm. The substrate was coated on both sides with cured and dried paste for a lead acid battery.

The bottom tool was then raised such that the two parts were brought into contact. A pressure of 30 bar was applied and the top part was vibrated at 240 Hz with an amplitude of 1.5 mm. The welding operation was terminated when a weld penetration depth of 0.3 mm was achieved. The welding took approximately 15 seconds to complete.

The integrity of the resulting seal was checked using a pressure tester (Uson Qualitek mR) and shown to be leak free (pressure loss was 0 mbar/second). The procedure was repeated for a total of 40 vibration welded, pasted substrate-frame assemblies with 100% pass rate.

Comparative Examples

Comparative examples were carried out using identical substrates and frames. However, instead of joining the substrates and frames together using the vibration welding method described herein, the substrates and frames were glued together. A thin bead of acrylic adhesive was applied to the frame sections. The pasted substrates were then located into the frames and pressed into position for 25 minutes. The resulting assemblies were stored for 24 hours at room temperature to allow the glue to fully cure before the integrity of the seals was checked by pressure testing. It was found that of the 857 assemblies tested a total of 70 failed the leak test criterion of a leakage rate of less than 0.055 mbar/second-a pass rate of 91.81.

| Sealing Method | Time required to complete sealing | Pass rate (<0.055 mbar/s) |
| --- | --- | --- |
| Vibration welding | 15 seconds | 100% |
| Adhesive bonding | 24 hours | 91.8% |

Additionally, example 1 was repeated but the bipolar substrates used for these experiments did not have an integral strip of ABS incorporated within the periphery of the substrate. Attempts were made to seal the substrate to the ABS bipolar battery frame using a welding depth of 0.3 mm. When the part was removed from the vibration welder it was found that the ABS frame had melted as visually evidenced by a well formed weld bead on the frame but no adhesion to the bipolar substrate had occurred and the two parts separated easily. Further examples were carried out using varied process parameters including surface abrasion of the bipolar substrate periphery, weld depth and amplitude but it was not possible to form a satisfactory adhesive bond or seal between the frame and the substrate.

The invention claimed is:

1. A method of joining a substrate for a bipolar electrode of a bipolar battery to a frame for supporting the bipolar electrode for use in the bipolar battery, the method comprising:
   implanting a thermoplastic material in the substrate; and
   vibration welding the substrate and the frame at a frequency in the range of 50 Hz to 1 kHz to at least partially melt the thermoplastic material such that it forms a continuous or substantially continuous loop around the substrate to join the substrate and the frame together.

2. The method of claim 1 wherein the vibration welding seals the substrate and the frame together.

3. The method of claim 1, wherein the vibration welding seals the substrate and the frame together in a continuous manner.

4. The method of claim 1, wherein the substrate and the frame have an interlocking configuration.

5. The method of claim 1, wherein the substrate comprises titanium suboxide having the formula $Ti_nO_{2n-1}$ where n is 4 or greater.

6. The method of claim 1, wherein the frequency is in the range of 50 Hz to 260 Hz.

7. A bipolar battery comprising a substrate for a bipolar electrode of a bipolar battery and a frame for supporting the bipolar electrode for use in the bipolar battery joined together by the method as defined in claim 1.

8. A substrate for a bipolar electrode for use in the method of claim 1 wherein the substrate comprises a thermoplastic material which is implanted in the substrate and forms a continuous or substantially continuous loop around the substrate.

9. The substrate of claim 8 wherein the continuous or substantially continuous loop around the substrate has a width of from 1 mm to 15 mm.

10. The substrate of claim 8, wherein the continuous or substantially continuous loop has a depth of from 0.1 to 10 mm.

11. The substrate of claim 8 wherein the substrate comprises a material selected from the group consisting of $Ti_4O_7$, $Ti_5O_9$, $Ti_6O_{11}$, and mixtures of two or more thereof.

12. The substrate of claim 8 wherein the thermoplastic material comprises a material selected from the group consisting of acrylonitrile butadiene styrene (ABS), polyethylene, polypropylene, acrylonitrile butadiene styrene/polycarbonate, blends thereof and mixtures of two or more thereof.

13. The method of claim 3 wherein the substrate and the frame have an interlocking configuration.

14. The method of claim 4, wherein the substrate comprises titanium suboxide having the formula $Ti_nO_{2n-1}$ where n is 4 or greater.

15. The method of claim 13, wherein the frequency is in the range of 50 Hz to 260 Hz.

16. The method of claim 1 wherein the thermoplastic material comprises a material selected from the group consisting of acrylonitrile butadiene styrene (ABS), polyethylene, polypropylene, acrylonitrile butadiene styrene/polycarbonate, blends thereof and mixtures of two or more thereof.

17. The method of claim 1 wherein:
the thermoplastic material comprises a material selected from the group consisting of acrylonitrile butadiene styrene (ABS), polyethylene, polypropylene, acrylonitrile butadiene styrene/polycarbonate, blends thereof and mixtures of two or more thereof; and
the substrate comprises titanium suboxide having the formula $Ti_nO_{2n-1}$ where n is 4 or greater.

* * * * *